(12) United States Patent
Kim

(10) Patent No.: US 11,046,164 B2
(45) Date of Patent: Jun. 29, 2021

(54) BED COVER ASSEMBLY FOR PICKUP TRUCK

(71) Applicants: Hyundai Motor Company, Seoul (KR); KIA Motors Corporation, Seoul (KR)

(72) Inventor: Hak-Lim Kim, Gyeonggi-do (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 71 days.

(21) Appl. No.: 16/416,722

(22) Filed: May 20, 2019

(65) Prior Publication Data

US 2020/0130492 A1 Apr. 30, 2020

(30) Foreign Application Priority Data

Oct. 25, 2018 (KR) .................. 10-2018-0128242

(51) Int. Cl.
*B60R 19/34* (2006.01)
*B60J 11/02* (2006.01)
*B60J 11/06* (2006.01)
*B60J 7/06* (2006.01)

(52) U.S. Cl.
CPC ............. *B60J 11/025* (2013.01); *B60J 7/068* (2013.01); *B60J 11/06* (2013.01); *B60Y 2200/14* (2013.01)

(58) Field of Classification Search
CPC ... B60J 7/141; B60J 7/067; B60J 7/041; B60J 7/062; B23Q 11/08; Y10T 409/30392; Y10T 483/115; B60R 9/00; B62D 33/0273; B60P 1/38
See application file for complete search history.

(56) References Cited

U.S. PATENT DOCUMENTS

| | | | | |
|---|---|---|---|---|
| 3,640,565 | A * | 2/1972 | Anderson | B60J 7/041 296/100.04 |
| 3,649,072 | A * | 3/1972 | Cross | B60J 7/041 296/100.03 |
| 4,518,194 | A * | 5/1985 | Kirkham | B60J 7/041 160/84.02 |
| 4,717,196 | A * | 1/1988 | Adams | B60J 5/14 160/201 |
| 4,784,427 | A * | 11/1988 | Burgess | B60J 7/068 160/314 |
| 4,786,099 | A * | 11/1988 | Mount | B60J 7/068 296/100.05 |
| 4,795,206 | A * | 1/1989 | Adams | B60J 5/14 160/201 |
| 4,807,921 | A * | 2/1989 | Champie, III | B60J 7/068 160/235 |

(Continued)

*Primary Examiner* — Kiran B Patel
(74) *Attorney, Agent, or Firm* — Brinks Gilson & Lione

(57) ABSTRACT

A bed cover assembly for a pickup truck may include cover guides coupled to upper ends of both body sides of a pickup truck and having guide means such as a guide rail formed inward of the truck; a bed cover coupled between the cover guides to slide along the guide means; and rotary guide rail assemblies hinged to both body sides of the rear of the truck, wherein when the bed cover moves rearward, the rotary guide rail assemblies rotate upward about respective hinge axes thereof and the bed cover moves along guide means formed at the rotary guide rail assemblies.

8 Claims, 3 Drawing Sheets

(56) References Cited

U.S. PATENT DOCUMENTS

| | | | | |
|---|---|---|---|---|
| 4,889,381 | A * | 12/1989 | Tamblyn | B60J 7/068 296/98 |
| 5,040,843 | A * | 8/1991 | Russell | B60J 7/068 160/133 |
| 5,156,518 | A * | 10/1992 | VanMatre | B60P 1/006 414/507 |
| 5,251,950 | A * | 10/1993 | Bernardo | B60J 7/041 296/100.03 |
| 5,330,246 | A * | 7/1994 | Bernardo | B60J 7/068 160/130 |
| 5,350,213 | A * | 9/1994 | Bernardo | B60J 7/041 160/133 |
| 5,775,765 | A * | 7/1998 | Kintz | B60J 7/085 160/23.1 |
| 6,030,021 | A * | 2/2000 | Ronai | B60J 7/085 296/100.12 |
| 6,276,735 | B1 * | 8/2001 | Champion | B60J 7/041 296/100.06 |
| 6,846,032 | B2 * | 1/2005 | de Gaillard | B60P 7/04 160/133 |
| 6,976,724 | B2 * | 12/2005 | Wheatley | B60J 7/062 296/100.15 |
| 8,727,424 | B1 | 5/2014 | Nelson | |
| 9,254,735 | B2 * | 2/2016 | Spencer | B60J 7/185 |
| 9,278,611 | B2 * | 3/2016 | Maimin | B60P 7/02 |
| 9,296,285 | B2 * | 3/2016 | Copp | B60J 7/196 |
| 9,399,390 | B1 * | 7/2016 | Shortz, Jr. | B60J 7/085 |
| 9,399,391 | B2 * | 7/2016 | Bernardo | B60J 7/085 |
| 9,834,076 | B2 * | 12/2017 | Rohr | B60J 7/067 |
| 10,023,035 | B2 * | 7/2018 | Facchinello | B60J 7/198 |
| 10,112,464 | B2 * | 10/2018 | Koengeter | B60J 10/277 |
| 10,315,498 | B2 * | 6/2019 | Parkey | B60J 7/141 |
| 10,406,896 | B2 * | 9/2019 | Ford | B60R 5/04 |
| 10,406,897 | B2 * | 9/2019 | Spencer | B60J 7/141 |
| 10,596,887 | B2 * | 3/2020 | Rossi | B60R 5/048 |
| 2003/0230909 | A1 * | 12/2003 | Melius | B60J 7/067 296/98 |
| 2004/0155082 | A1 * | 8/2004 | Steffens | B60R 7/08 224/403 |
| 2010/0308617 | A1 * | 12/2010 | Golden | B60J 7/141 296/39.2 |
| 2016/0236552 | A1 * | 8/2016 | Hannan | B60P 7/04 |
| 2017/0341494 | A1 * | 11/2017 | Hannan | B60J 7/068 |
| 2018/0126833 | A1 * | 5/2018 | Hannan | B60J 7/068 |
| 2018/0134132 | A1 * | 5/2018 | Nania | B60J 11/00 |
| 2019/0193536 | A1 * | 6/2019 | Pompili | B60P 7/02 |
| 2019/0389287 | A1 * | 12/2019 | Pompili | B60J 7/196 |

* cited by examiner

BED COVER ASSEMBLY FOR PICKUP TRUCK

CROSS-REFERENCE TO RELATED APPLICATION

This application claims priority to and the benefit of Korean Patent Application No. 10-2018-0128242, filed on Oct. 25, 2018, which is incorporated herein by reference in its entirety.

FIELD

The present disclosure relates to a pickup truck that is a kind of light truck; and, particularly, to a bed cover assembly for a pickup truck.

BACKGROUND

The statements in this section merely provide background information related to the present disclosure and may not constitute prior art.

A pickup truck is a kind of light truck that combines functions of a truck with a sports utility vehicle (SUV), unlike a commercial-style light truck that is mainly used for freight loading.

The pickup truck mainly has a single interior space or two rows of small interior spaces, and a loading space for freight loading in the rear of the truck.

The loading space includes a bed as the bottom, a space defined by the side formed integrally with the body of the truck to load freight onto the bed, and a tail gate opened and closed in a flap form in the rear thereof.

The loading space may be provided with a bed cover that covers the top thereof for the case where no freight is loaded into the loading space.

Meanwhile, such a pickup truck functions not only as a light truck but also as a sedan or an SUV. Therefore, a spoiler is also mounted to the pickup truck to remove air vortex generated in the rear thereof for driving performance.

The conventional spoiler applied to the pickup truck may be provided separately at the upper end of the bed cover, which leads to an increase in cost and weight.

The conventional spoiler may also be fixed to the upper end of the tail gate. However, this fixed structure may be limited in design and may cause the spoiler to be damaged due to interference with freight during loading.

In addition, an in-bed spoiler, such as the one disclosed in U.S. Pat. No. 8,727,424 may also be damaged due to interference with freight.

The foregoing is intended merely to aid in the understanding of the background of the present disclosure, and is not intended to mean that the present disclosure falls within the purview of the related art that is already known to those skilled in the art.

SUMMARY

In one aspect, the present disclosure is directed to a bed cover assembly for a pickup truck, capable of reducing the risk of damage due to interference with freight during loading while reducing cost and weight.

The present disclosure can be understood by the following description. Also, it is obvious to those skilled in the art to which the present disclosure pertains that the present disclosure can be realized by the means as described and combinations thereof.

In accordance with the present disclosure, a bed cover assembly for a pickup truck may include cover guides coupled to upper ends of both body sides of a pickup truck and having guide means such as a rail formed inward of the truck, a bed cover coupled between the cover guides to slide along the guide means, and rotary guide rail assemblies hinged to both body sides of the rear of the truck, wherein when the bed cover moves rearward, the rotary guide rail assemblies rotate upward about respective hinge axes thereof and the bed cover moves along guide means formed at the rotary guide rail assemblies.

The bed cover may include an upper lid and a rear lid, and the rear lid may be movable along the guide means formed at the rotary guide rail assemblies.

The upper lid may have an irregular shape, and the rear lid may have a flat shape.

The upper lid may have rotary guide rail pushers shaped to extend downward and be bent from both sides thereof so that the rotary guide rail assemblies are pushed upward by the rotary guide rail pushers.

When the bed cover fully moves, the rear lid may rotate downward about the upper lid.

The bed cover assembly may further include a bed cover support coupled to an upper end of a tail gate formed in the rear of the pickup truck, and the rear lid may be seated in a support groove formed in a longitudinal direction of the bed cover support.

Each of the rotary guide rail assemblies may be configured such that its upper portion is a guide hinged to an associated one of both body sides of the rear of the truck and its lower portion extends in a flat form from the guide.

The guide may be hinged to the truck body in the front thereof.

The rotary guide rail assembly may be chamfered at the rear thereof.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
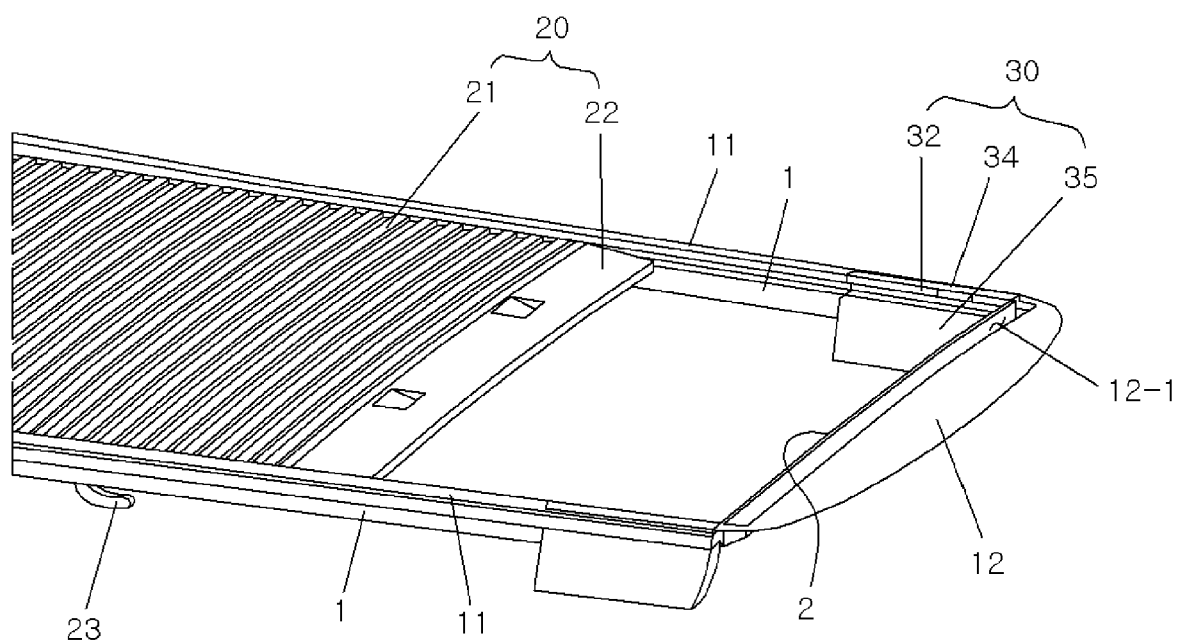
FIG. 1 illustrates a bed cover assembly for a pickup truck according to an aspect of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The accompanying drawings should be referred to in order to gain a sufficient understanding of the present disclosure.

In aspects of the present disclosure, techniques well known in the art or repeated descriptions may be reduced or omitted to avoid obscuring appreciation of the disclosure by a person of ordinary skill in the art.

Figure 2:
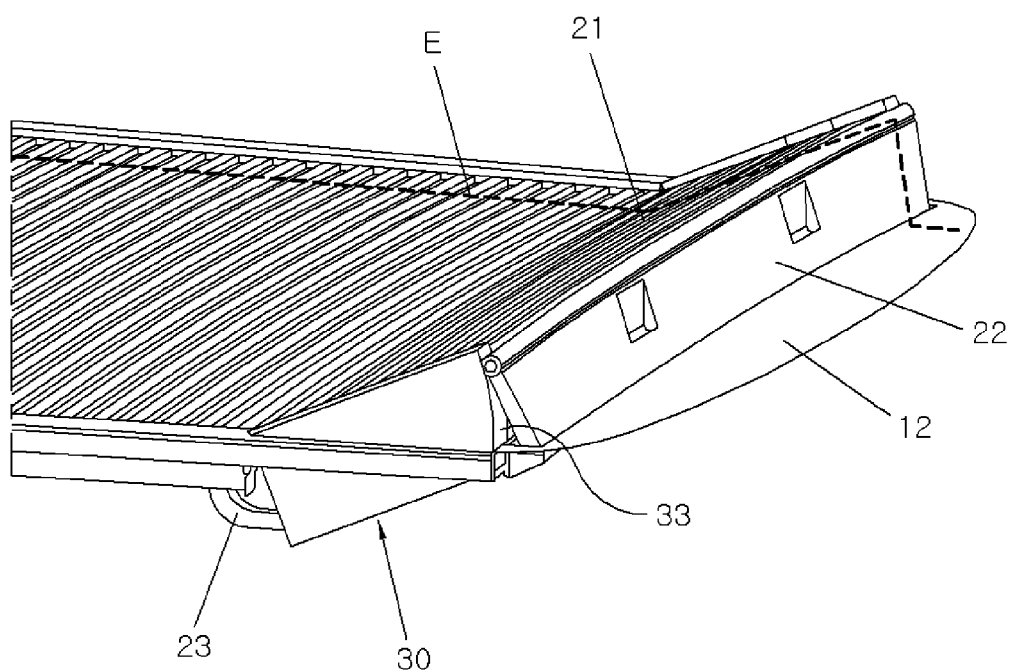
FIG. 2 illustrates a state of operation of the bed cover assembly for a pickup truck according to one aspect of the present disclosure.
Figure 3:
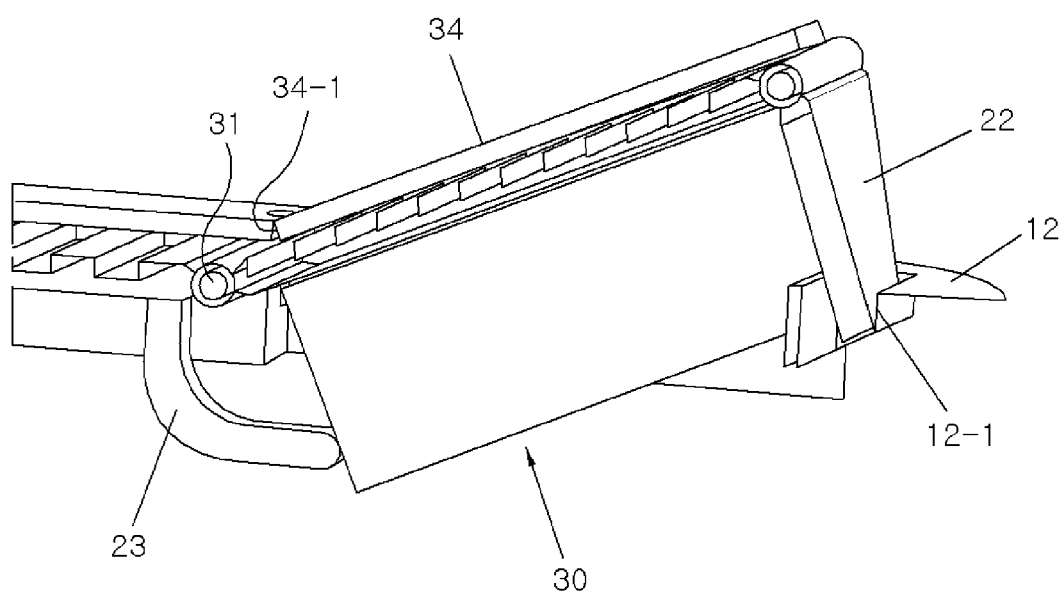
FIG. 3 is a cross-sectional view taken along line E of FIG. 2.

FIG. 1 illustrates a bed cover assembly for a pickup truck according to one aspect of the present disclosure. FIG. 2 illustrates a state of operation of the bed cover assembly for a pickup truck according to an aspect of the present disclosure. FIG. 3 is a cross-sectional view taken along line E of FIG. 2.

Hereinafter, the bed cover assembly for a pickup truck according to an aspect of the present disclosure will be described with reference to FIGS. 1 to 3.

The bed cover assembly of the present disclosure serves to cover the top of the loading space of a pickup truck, and is also capable of integrally functioning as a spoiler.

To this end, the bed cover assembly according to this aspect includes a bed cover 20 for covering the top of a loading space, cover guides 11 and a bed cover support 12 for guiding and supporting the bed cover 20, and rotary guide rail assemblies 30.

The cover guides 11 are coupled to the upper ends of both sides 1 of the body of a pickup truck, and have guide means, such as rails formed inward of the truck, coupled with slide means such as rollers formed at the bed cover 20. Thus, the cover guides 11 are configured to support the sides of the bed cover 20 and allow the bed cover 20 to slide.

The bed cover support 12 is coupled to the upper end of a tail gate formed in the rear of the pickup truck, so that the bed cover 20 may fully close the loading space by contact with the bed cover support 12.

The bed cover support 12 has a support groove 12-1 formed in the longitudinal direction thereof for supporting the end of a rear lid 22 to be described later of the bed cover 20.

The slide means such as rollers on both sides of the bed cover 20 are coupled with the cover guides 11 so that the bed cover 20 slides to close or open the loading space.

The bed cover 20 consists of an upper lid 21 and a rear lid 22.

The upper lid 21 has a repeated irregular shape, which is in some aspects not a flat shape, so as to be bent and the rear lid 22 has a flat shape.

The upper lid 21 has rotary guide rail pushers 23 shaped to extend downward and be bent from both sides thereof so as to push the rotary guide rail assemblies 30. Stated another way, the irregular shape of the upper lid 21 may be formed by corrugations (curved or rectilinear), stepped sections, curved sections, raised sections, indented sections, combinations thereof, or other non-planar shapes.

Each of the rotary guide rail assemblies 30 is configured such that its upper portion is a guide 34, having a guide means such as a guide rail 32, which is hinged to the side of the truck body and formed inward of the truck, and its lower portion 35 extends in a flat form from the guide.

The guide 34 may be hinged to the truck body at a front portion 34-1 thereof.

The rotary guide rail assembly 30 may be chamfered 33 at the rear thereof as illustrated in the drawing so as not to interfere with the tail gate and the bed cover support 12 during rotation.

As described above, in the bed cover assembly of the present disclosure, the cover guides 11 and the bed cover support 12 are respectively mounted to the sides of the truck body and the tail gate to support the bed cover 20, and the bed cover 20 slides to close or open the loading space and also serves as a spoiler when it is operated to close the loading space as in FIG. 2.

Referring to FIGS. 2 and 3, when the bed cover 20 slides toward the rear of the truck, namely the tail gate, the rotary guide rail pushers 23 coupled to the bed cover 20 push the rotary guide rail assemblies 30 coupled to the sides of the rear of the truck body so that the rotary guide rail assemblies 30 hinged to the truck body rotate around hinge axes 31 upward as illustrated in the drawing.

Thus, the bed cover 20 slides along the guide means (such as a guide rail) inside the rotary guide rail assemblies 30. When the bed cover 20 fully slides into a final position 2, the rear lid 22 of the bed cover 20 rotates downward about the upper lid 21 coupled thereto so that the end of the rear lid 22 is seated in and supported by the support groove 12-1 of the bed cover support 12. The final position 2 may be a final closed position, or a final open position, and the bed cover 20 may be said to "fully move" or "fully slide" to such a position.

As illustrated in the drawing, when the operation of the bed cover assembly is completed, the bed cover 20 is positioned upward at a portion of the rear thereof and covered at the rear thereof by the rear lid 22 and at the sides thereof by the rotary guide rail assemblies 30. Therefore, the bed cover 20 serves as a spoiler together with the rear lid 22.

As described above, the bed cover assembly of the present disclosure need not form a separate spoiler since the bed cover serves as the spoiler, and is free from the risk of damage since it is not interfered with freight during opening and loading.

According to the bed cover assembly for a pickup truck of the present disclosure, it is possible to reduce cost and weight, compared to having a separate spoiler, since the bed cover itself also serves as a spoiler.

Since the spoiler pops up only when the bed cover is closed, there is no interference between the spoiler and the loaded freight so that the risk of damage can be removed.

While aspects of the present disclosure have been described with reference to the drawings, the present disclosure is not limited thereto. It will be apparent to those skilled in the art that various changes and modifications may be made without departing from the spirit and scope of the disclosure. Therefore, these changes and modifications will fall within the scope of the disclosure.

What is claimed is:

1. A bed cover assembly for a pickup truck, the pickup truck comprising a body defining two body sides, the bed cover assembly comprising:

cover guides including a pair of first guide rails coupled to upper ends of both body sides of a pickup truck;

a bed cover disposed between the pair of first guide rails and configured to slide along the pair of first guide rails; and rotary guide rail assemblies arranged to face to each other and each including a pair of second guide rails and hinged to both body sides of a rear of the truck, wherein when the bed cover moves rearward along the pair of first guide rails and the pair of second guide rails of the rotary guide rail assemblies, the rotary guide rail assemblies rotate upward about respective hinge axes thereof, wherein:

each of the rotary guide rail assemblies includes an upper portion and a lower portion, the upper portion is a guide hinged to an associated one of both body sides of the rear of the truck, and the lower portion extends in a flat form from the guide.

2. The bed cover assembly of claim 1, wherein:

the bed cover comprises an upper lid and a rear lid; and the rear lid is movable along the pair of second guide rails formed at the rotary guide rail assemblies.

3. The bed cover assembly of claim 2, wherein:

the upper lid is at least partly in a wave form; and the rear lid has a flat shape.

4. The bed cover assembly of claim 2, wherein the upper lid has a rotary guide rail pusher to which is extended downward from the upper lid and bent toward the rotary guide rail assemblies so that at least one of the rotary guide rail assemblies is pushed upward by the rotary guide rail pusher.

5. The bed cover assembly of claim 2, wherein when the bed cover fully moves into a final position, the rear lid rotates downward about the upper lid.

6. The bed cover assembly of claim 5, further comprising a bed cover support formed in the rear of the pickup truck, wherein the rear lid is seated in a support groove formed in a longitudinal direction of the bed cover support.

7. The bed cover assembly of claim 1, wherein the guide is hinged to the truck body at a front portion thereof.

8. The bed cover assembly of claim 7, wherein the rotary guide rail assembly is chamfered at the rear thereof.

* * * * *